Patented May 5, 1942

2,282,112

UNITED STATES PATENT OFFICE 2,282,112

METHOD FOR MAKING THE CONTAMINATED WATER FROM ALKALINE PULP MILLS HARMLESS

Hilding Olof Vidar Bergström and Karl Gustav Trobeck, Stockholm, Sweden

No Drawing. Application February 17, 1940, Serial No. 319,478. In Finland February 20, 1939

3 Claims. (Cl. 210—2)

The impurities in the waste water from alkaline pulp mills are present in the following liquids: condensates from the digesters, diffusers and evaporators, and waste water from the washing of the pulp.

This invention covers a method to make the impurities in these liquids harmless. When they flow through towers filled with wood blocks, clayrings, etc., or other suitable arrangements and brought in contact with gases, air, steam, or a mixture of same, the impurities disappear.

Wash water or condensate contaminated with cooking liquor treated in this manner foams considerably, and the apparatus plugs up and cannot function.

By experiments we have proven that the foaming can be eliminated in the following manner:

1. By recirculating part of the liquid flowing down to the bottom of the tower.

2. By adding to the liquid lime sludge, lime or other materials which have similar influence, or a mixture of such materials.

By adding, for instance, lime sludge, is obtained a liquid with pH of about 7. This has another great advantage, as the acids of fats and resins in the wash water which are harmful for the streams precipitate, and can be removed through filtration.

The treatment of the miscellaneous waste liquids also in case of addition of lime sludge or other materials, is done with boiler gases, gases from the recovery plant, or from the lime recovery oven, with air, steam, or a mixture of same. Different apparatuses may be used, for instance, towers with fillings, towers where the solution is sprayed through nozzles or in other ways finely distributed, rotary discs, or a fan, etc. On the whole any apparatus can be used for this process wherein intimate contact between the liquid and gas is obtained.

A specific example for carrying out the present invention comprises introducing the pulp mill waste water in the top of a suitable tower at a temperature of approximately 80° C. and at the rate of about 10 cubic meters per hour. Gases from the boiler room or recovery room are admitted at the bottom of the tower at the rate of about 17,200 cubic meters per hour and at a temperature ranging from 150° C. to 250° C. The gases are intimately intermixed with the waste water in the tower and the volatilizable impurities in the water are volatilized and carried off with the gases, the water being discharged free of such impurities. Alternatively, preheated air, within the temperature range above referred to, may be introduced into the tower in lieu of the gases in practicing our invention. It will be found when the invention is practiced as above set out that the temperature of the water and gases leaving the tower will be about 55° C. In order to reduce foaming caused by the mixing of the waste water and gases, any suitable alkaline earth metal, such as lime sludge ($CaCO_3$), may be added in the tower. In the present example lime sludge added at the rate of 50 kilograms per hour gives satisfactory results. Lime sludge is especially convenient since it is a by-product of the liquor in making kraft pulpmill.

The foam developed in the tower can also be killed with paddles, etc.

The miscellaneous liquids can be treated separately or mixed. Enough gases, etc., must be introduced that a sufficient quantity of the impurities is eliminated.

We claim as our invention:

1. The method of removing water polluting substances from pulp mill waste water, which comprises bringing said waste water into intimate contact with a gaseous fluid and thereby volatilizing such substances, removing the volatilized substances with said gaseous fluid, and adding to said waste water a member of the group consisting of hydrates and carbonates of alkaline earth metals effective to reduce foaming caused by treatment of said waste water with said gaseous fluid.

2. The method of removing water polluting substances from pulp mill waste water, which comprises bringing a continuous stream of said waste water into intimate contact with a continuous supply of a gaseous fluid thereby volatilizing the volatile substances in said waste water, removing the volatilized substances with said gaseous fluid, and adding to said waste water a member of the group consisting of hydrates and carbonates of alkaline earth metals thereby reducing foaming caused by treatment of the waste water with said gaseous fluid and precipitating out the acids of fats and resins in said waste water.

3. The method of removing water polluting substances from pulp mill waste water, which comprises bringing a continuous stream of said waste water into intimate contact with a continuous supply of a gaseous fluid thereby volatilizing the volatile substances in said waste water, removing the volatilized substances with said gaseous fluid, and adding to said waste water a member of the group consisting of hydrates and carbonates of alkaline earth metals thereby reducing foaming caused by treatment of said waste water with said gaseous fluid and precipitating out the acids of fats and resins in said waste water, removing said precipitate, and recirculating part of the water from which said water polluting substances have been removed together with said continuous stream of waste water to further reduce foaming.

HILDING OLOF VIDAR BERGSTRÖM.
KARL GUSTAV TROBECK.